United States Patent
Luchaup

(10) Patent No.: US 7,039,590 B2
(45) Date of Patent: May 2, 2006

(54) GENERAL REMOTE USING SPOKEN COMMANDS

(75) Inventor: Daniel Luchaup, Marblehead, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 618 days.

(21) Appl. No.: 09/822,617

(22) Filed: Mar. 30, 2001

(65) Prior Publication Data

US 2002/0143555 A1 Oct. 3, 2002

(51) Int. Cl.
*G10L 21/00* (2006.01)

(52) U.S. Cl. .................. 704/275; 704/270; 367/197

(58) Field of Classification Search ............... 704/251, 704/257, 270, 275; 367/198, 197, 199
See application file for complete search history.

(56) References Cited

U.S. PATENT DOCUMENTS

| | | | |
|---|---|---|---|
| 5,583,965 A * | 12/1996 | Douma et al. ............... | 704/275 |
| 5,774,859 A * | 6/1998 | Houser et al. ............... | 704/275 |
| 5,802,467 A * | 9/1998 | Salazar et al. ............... | 455/420 |
| 5,950,166 A | 9/1999 | Häb-Umbach et al. | |
| 6,119,088 A | 9/2000 | Ciluffo | |
| 6,188,985 B1 * | 2/2001 | Thrift et al. ................ | 704/275 |
| 6,188,986 B1 | 2/2001 | Matulich et al. | |
| 6,553,345 B1 * | 4/2003 | Kuhn et al. .................. | 704/275 |
| 6,606,280 B1 * | 8/2003 | Knittel ......................... | 367/198 |
| 6,799,098 B1 * | 9/2004 | Horst et al. ................... | 701/19 |

OTHER PUBLICATIONS

Smarthome.Com Internet Information on Hal 2000 Voice Control System, "Control Your Home by Voice Command!" dated Mar. 2, 2001, 4 pgs.
Smarthome.Com Internet Information on Voice Activated Remote Control, "Command Your Living Room With the Sound of Your Voice!" dated Mar. 2, 2001, 3 pgs.

* cited by examiner

*Primary Examiner*—Abul K. Azad
(74) *Attorney, Agent, or Firm*—Osha Liang LLP

(57) ABSTRACT

A speech-translating remote control includes a microphone operable to receive speech command, thereby outputting a speech signal; an audio transmitter operably connected to the microphone to transmit an audio input signal to a host system based on the speech signal; a signal receiver to receive a command signal transmitted by the host transmitter; and a signal transmitter operably connected to the signal receiver to transmit a control signal to an appliance based on the command signal.

17 Claims, 7 Drawing Sheets

GENERAL REMOTE USING SPOKEN COMMANDS

BACKGROUND OF INVENTION

1. Field of the Invention

The present invention relates generally to speech-recognition devices.

2. Background Art

The use of speech-recognition (or voice-recognition) technology is becoming a viable means to control one's environment. As the sophistication of the speech-recognition technology increases and the cost of the equipment decreases, the use of speech-activated devices will become commonplace. Applications for speech recognition technology are numerous. Obvious examples include the control of appliances, consumer electronics, toys, and tools. Speech recognition technology is most useful when the hands and/or eyes are busy or useless, e.g., while driving or in a dark room. Furthermore, speech recognition technology can be a big help for people with physical impairments.

Speech recognition technology has been under development for several decades. This development has resulted in a variety of hardware and software tools for personal computers. Speech-recognition systems used to require specialized circuit boards (i.e., those with digital signal processors (DSPs)) and software. With the development of more powerful and sophisticated computer hardware, the need for specialized circuit boards has disappeared. Currently, most speech-recognition software can take advantage of the generally available computer hardware.

Speech-recognition technology comes in two flavors: finite command recognition (trivial speech recognition) and true dictation recognition (nontrivial speech recognition). The trivial speech recognition simply matches the speech pattern of a spoken command with a stored set of known commands. This type of speech recognition is relatively straightforward and does not require costly and bulky equipment or software. In contrast, the nontrivial speech recognition can analyze the speech to recognize parts of speech, grammar, word meaning, and context. This type of speech recognition requires relatively expensive hardware and software. The hardware for nontrivial speech recognition tends to be bulky and cannot be incorporated into small devices.

The nontrivial speech-recognition technology can be further subdivided into two categories: discrete and continuous speech recognition. In discrete speech recognition, each spoken word must be separated by a brief pause (usually a few tenths of a second) so that the computer may distinguish the beginning and ending of words. In contrast, continuous speech recognition requires no pauses between the words and can process words spoken in a normal speech. The degree of sophistication of a continuous speech recognition system is often determined by the size of its vocabulary.

Speech recognition tools also can be classified into speaker-dependent and speaker-independent categories. The speaker dependent tools require a user to participate in extensive training exercises to drill the system to recognize the user's speech profile. The machine will then respond to the specific user. After such training, the accuracy of speech recognition is usually respectable. With a speaker independent system, on the other hand, no training of the system is required; any user can begin to use the machine, which will then attempt to adapt ("train") itself to the speech profile of the user. With the speaker independent system, the initial accuracy rate for speech recognition is less desirable, but it increases with use.

The choice of which type of speech-recognition applications to use is often dictated by the resources required. The cost of nontrivial speech-recognition tools has come down significantly in recent years. However, it is typically still too expensive to be deployed in remote controls for appliances such as household appliances and consumer electronics (herein, "appliance" will be used as a general term to refer to all types of electrical appliances and consumer electronics used in households or vehicles). In addition, the hardware required for nontrivial applications tends to be too bulky to be incorporated into small consumer products. In contrast, remote controls using other technologies (e.g., push buttons plus infrared or radio frequency tramsmitters) are more affordable. Consequently, they are widely used for controlling consumer electronics and appliances.

U.S. Pat. No. 6,119,088, issued to Ciluffo, discloses a voice-activated remote control that uses the trivial command recognition technology and allows for only dozens of pre-programmed voice commands. U.S. Pat. No. 6,188,986 B1 issued to Matulich et al., discloses a voice-activated device that controls a household electrical switch or an AC circuit. The Matulich device also uses the trivial speech-recognition technology. Thus, there exists a need to have remote controls that can respond to more sophisticated voice commands such as "VCR, tape the program from 8 to 9 PM and from 10 to 11 PM tonight." This type of sophisticated command will require nontrivial, continuous speech-recognition technology.

SUMMARY OF INVENTION

One aspect of the present invention relates to voice-translating remote controls for appliances, such as stereos, video cassette recorders (VCR), televisions (TV), coffee makers, microwave ovens, and lights. As a result, the remote control acts as a translator from voice (analog) to remote control commands (digital). One embodiment of the invention comprises a voice-translating remote control that includes a microphone and an audio input transmitter. The microphone receives voice input from a user, thereby outputting a voice signal. The audio transmitter transmits an audio input signal based on the voice signal to a host system, which includes a speech-recognition processor. After the host system has processed the audio input signal, it transmits a control signal directly to an appliance.

In another embodiment, the voice-translating remote control further comprises a signal receiver and a signal transmitter, which are operably connected. In this embodiment, the host system, after processing the audio input signal, transmits a command signal to the signal receiver in the remote control. The signal transmitter in the remote control then transmits a control signal based on the command signal to an appliance.

Another aspect of the invention relates to a system for voice-activated control of an appliance. The system comprises a host system and a remote control. The host system comprises a host receiver, a speech-recognition processor, and a host transmitter. The remote control comprises a microphone to receive voice command and to output a voice signal. An audio input signal based on the voice signal is transmitted by a suitable transmitter (e.g., an audio transmitter) in the remote control to the host system. The audio input signal received by the host system is processed by the speech-recognition processor to generate a command signal which is then transmitted either directly to the appliance or to the remote control which then transmits a control signal based on the command signal to an appliance.

In yet another aspect, embodiments of the invention relate to methods for controlling an appliance by voice command. The method comprises receiving a voice command by the remote control to output a voice signal, transmitting an audio input signal based on the voice signal by an audio transmitter in the remote control to the host system, processing the audio input signal by the speech-recognition processor in the host system to generate a command signal, and transmitting the command signal to an appliance or to the remote control which then retransmits a control signal based on the command signal to an appliance. The remote control may require user interaction/acknowledgment before forwarding the command signal to an appliance.

One advantage of the invention is that the voice-translating remote controls of the present invention may use the traditional, affordable infrared or RF technology, but provide the convenience and flexibility afforded by speech-recognition technology. By using a host system to handle speech-recognition, there is no need to duplicate the expensive resources for each control for the appliances and consumer electronic devices. Furthermore, by having a separate host system to process the speech recognition, the system is highly customizable. The programs for translation or speech recognition can easily be updated or changed, and the host has to "learn" only once the characteristics of a user's voice, appliance identification information, etc. Similarly, when updating a user's voice (when adding or changing a user) or appliance identification information, it is much simpler to update a host system than to update each remote control. Other advantages of the present invention will become apparent with the following discussion.

DETAILED DESCRIPTION

The invention relates to use of the nontrivial speech-recognition resources in a way that is affordable such that they can be used to control various electronic and electrical devices such as those found in homes, automobiles, boats, etc. Embodiments of the present invention employ a nontrivial speech-recognition resource centralized in a machine separate from the remote control units so that the expensive speech-recognition resources need not be duplicated for each remote control and/or appliance. Using the speech-recognition resources in the host system, the remote controls behave as a general remote translator (GRT), which can translate relatively sophisticated voice command into a proper control signal for any specific appliance. These remote controls may be generally referred to as "voice-translating remote controls."

Figure 1:
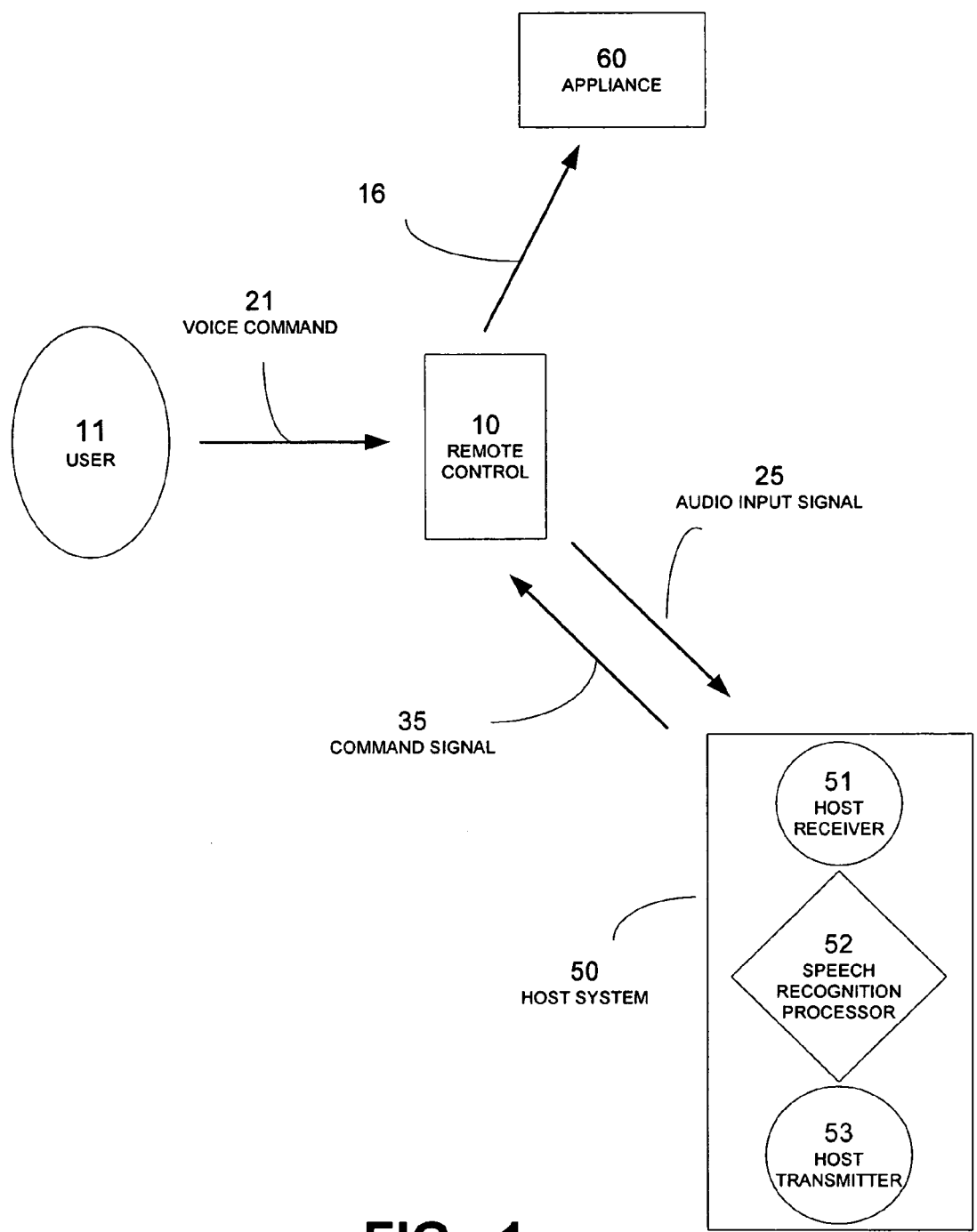
FIG. 1 is a schematic diagram of one embodiment of a voice-translating remote control system of the present invention.

FIG. 1 illustrates a schematic diagram of one embodiment of the present invention. A user 11 utters a speech command 21, which is not limited to the preprogrammed short command words, to a remote control 10. "Remote control" is generally used herein to refer to a device for controlling an appliance; it may look like, but is not identical to, a conventional remote control. In some embodiments, the remote control 10 may include a user interface (which may include an LCD display) and may look like a cellular phone or a personal digital assistant (e.g., a Palm Pilot™ from Palm, Inc., of Santa Clara, Calif.). Embodiments of the invention can also be used in an embedded system. For example, a device equivalent to the remote control 10 may be installed in a car to allow a driver to talk commands.

An audio input signal 25 is derived from the voice command 21 and transmitted to a host receiver 51 on a remote host system 50. The host system 50, which can be a dedicated unit or part of a general use computer, includes the host receiver 51, a speech-recognition processor 52, and a host transmitter 53. The speech-recognition processor 52 includes the necessary hardware and software for processing the speech recognition.

The audio input signal 25 received by the host receiver 51 is processed by the speech-recognition processor 52 to generate a command signal 35, which is transmitted by the host transmitter 53 to the remote control 10. The command signal 35 could include information such as the identity of the appliance 60 to be controlled and the command to be sent to the appliance 60. In this case, the identity of appliance 60 is extracted from the audio input signal 25 by the speech-recognition processor 52, which has in its memory (not shown) such identification information and the correct carrier frequency or pulse pattern (IR or RF) to control this particular appliance. In one embodiment, such appliance identification information and corresponding unique frequencies or pulse patterns could be remotely updated periodically from a database server connected to the Internet.

Alternatively, the command signal 35 may not include the appliance 60 identification information. Instead, a user may perform some act (e.g., pressing a button or a combination of buttons) on the remote control 10 to identify the appliance 60 to be controlled. In yet another embodiment, shown in FIG. 2A, the remote control may include a trivial speech-recognition processor 15, which extracts the appliance identification information from the voice signal 26. The appliance identification information (or unique frequency or pulse pattern) may be sent to the audio transmitter 20 to be included in the audio input signal 25 sent to the host system 50. Alternatively, this identification information may be used by the remote control 10 to generate a proper frequency or pulse pattern to encode the control signal 16 sent to the appliance 60.

The host system 50 may be a dedicated machine (an appliance) or part of a computer. It can be situated on the premises where the appliance 60 is located or it can be in a remote location so long as the remote control 10 (GRT) can communicate with the host system 50. Such communication, i.e., the transmission of the audio input signal 25 and the command signal 35 to and from the host system, can be accomplished either by wireless (e.g., radio frequency, microwave, or infrared communication) or wired (e.g., household wiring, local area network, wide area network, or internet) means. The wireless communication means is preferred for sake of mobility. The host system 50 does not have to be housed in one physical unit. For example, the host receiver 51 and the host transmitter 53 might be housed in separate units from that housing the speech-recognition processor 52. If these units are housed in different physical units, they should be in communication via a wireless or wired means; preferably a wired means.

The command signal 35 received by the remote control 10 is transmitted as a control signal 16 to the appliance to be controlled 60. The transmission of the control signal 16 can be accomplished by any of the wireless communication means such as infrared (IR) or radio frequency (RF). The type of the communication means will be determined by the receiver (not shown) on the appliance 60. In some embodiments of the present invention, the receiver on the appliance 60 is that currently in use such that no modification need be made to the receiver. For those appliances currently without receivers (e.g., lights, microwave ovens, coffee makers, etc.), it is preferred that they will be equipped with these general use, low-cost receivers (e.g., IR or RF receivers) in order to take advantage of the present invention.

Alternatively, after the command signal 35 is received by the remote control 10, there is an additional step of acknowledgment or validation before a control signal 16 is sent to the appliance 60. The acknowledgment or validation step will allow a user to correct errors arising from speech-recognition or abort the command. In such an embodiment, the remote control 10 comprises a user interface to permit display of message associated with the command signal 35. Such a display may be an LCD display as that used in a cellular phone or a personal digital assistant (e.g., a Palm Pilot™ from Palm, Inc. of Santa Clara, Calif.).

One skilled in the art will appreciate that the embodiment of FIG. 1 is for illustration only and variations of this embodiment are possible. For example, the command signal 35 generated by the speech-recognition processor 52 can be transmitted directly to the appliance 60. In such an embodiment, the command signal 35 will be in a format compatible with the common IR or RF receiver found on the appliance 60 and the remote control 10 will not need the second receiver (30 in FIG. 2) and the second transmitter (14 in FIG. 2).

Figure 2:
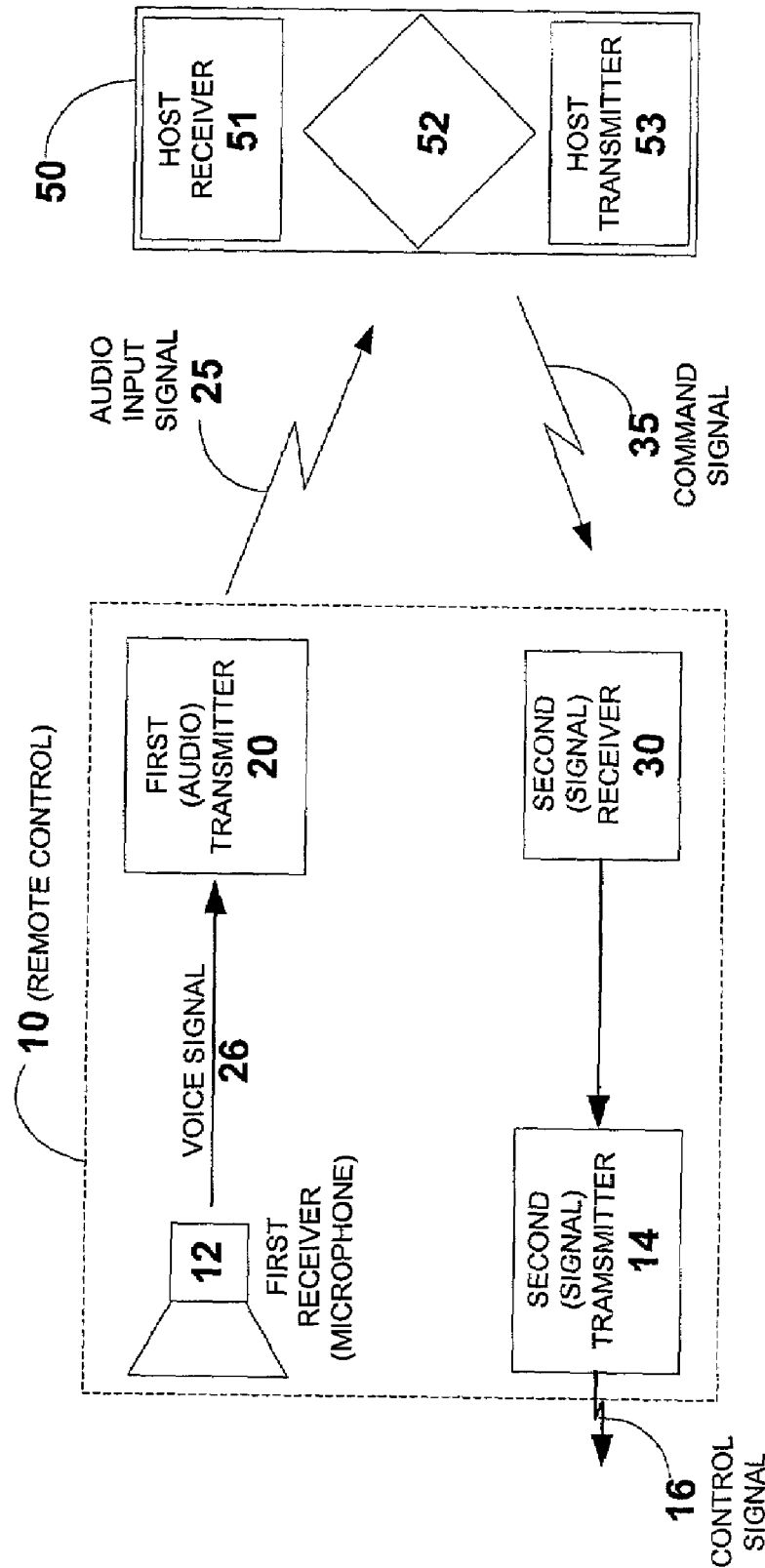
FIG. 2 is a schematic diagram of one embodiment of a voice-translating remote control of the present invention.

FIG. 2 illustrates key components of the remote control 10. The remote control 10 includes a first receiver 12 (also referred to as a microphone) for receiving speech commands (21 in FIG. 1) and to output a speech signal 26. The remote control 10 also includes a first transmitter 20 (also referred to as an audio transmitter) to transmit audio input signal 25 based on the speech signal 26 to the host system 50. In some embodiments of the present invention, the audio input signal 25 and the speech signal 26 may be the same signal. In other embodiments, the audio input signal 25 and the voice signal 26 may have different characteristics. Further, the remote control 10 includes a second receiver 30 (a signal receiver) to receive the command signal 35 transmitted from the host system, and a second transmitter 14 (a signal transmitter) to transmit the control signal 16 to the appliance (60 in FIG. 1). In some embodiments, the second transmitter 14 is a type that will transmit IR or RF signals such as those commonly used with traditional remote controls. These key components constitute one embodiment of the remote control of the present invention. One skilled in the art will appreciate that many variations are possible without departing from the scope of the present invention. For example, the remote control 10 may further include amplifiers or filters for signal conditioning, or the remote control 10 may not need the second receiver 30 and the second transmitter 14 if, as discussed above, the host system directly transmits the command signal 35 to the appliance 60.

Figure 2A:
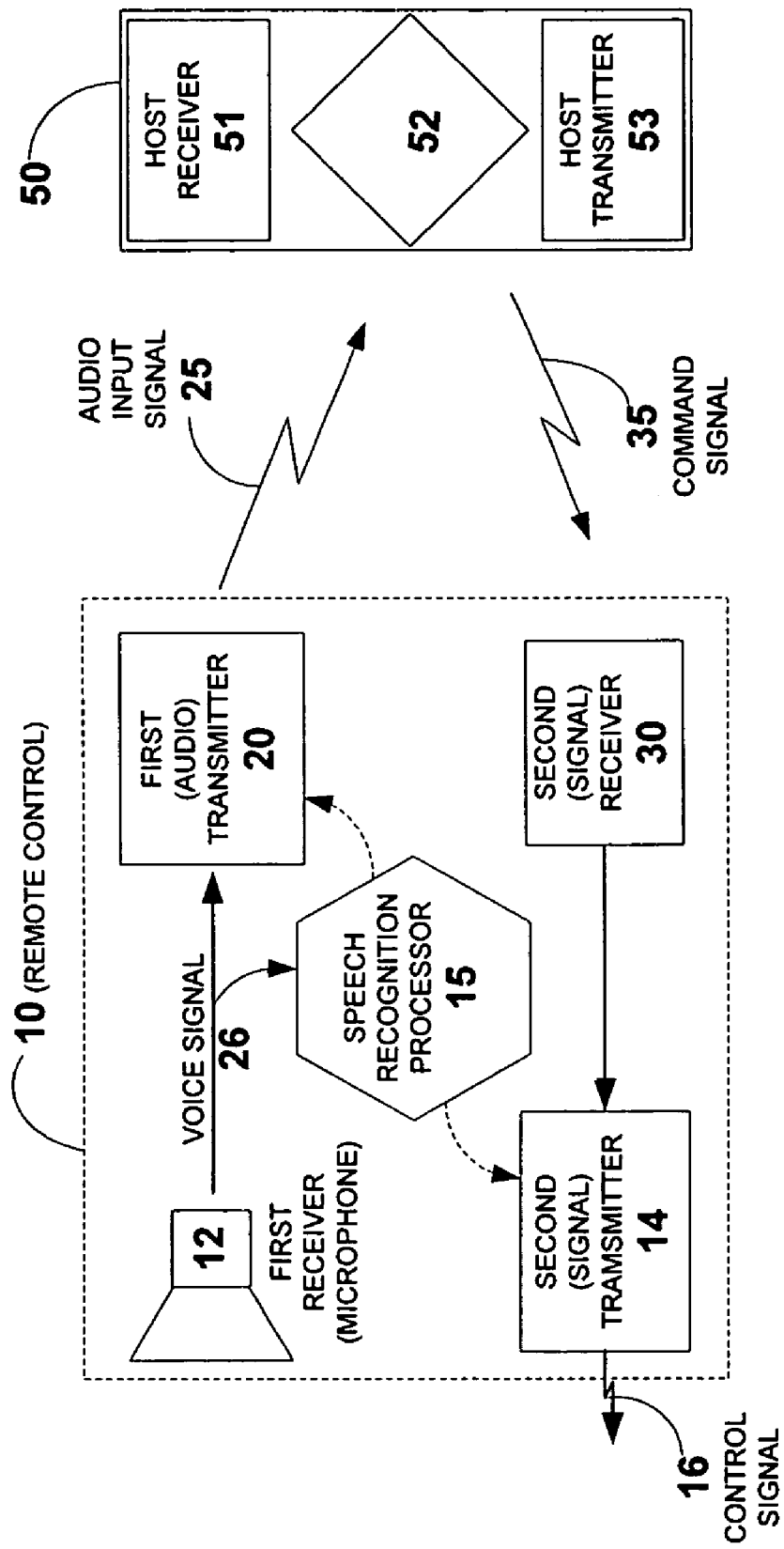
FIG. 2A is a schematic diagram of another embodiment of a voice-translating remote control of the present invention.

FIG. 2A illustrates another embodiment of the remote control 10. In this embodiment, the remote control 10 further comprises a trivial speech-recognition processor 15. The speech-recognition processor 15 can extract the appliance identification information from the speech signal 26. Once extracted, the appliance identification information can be either included in the audio input signal 25 sent by the audio transmitter 20 or sent to the signal transmitter 14 to be used to encode the control signal 16.

Figure 2B:
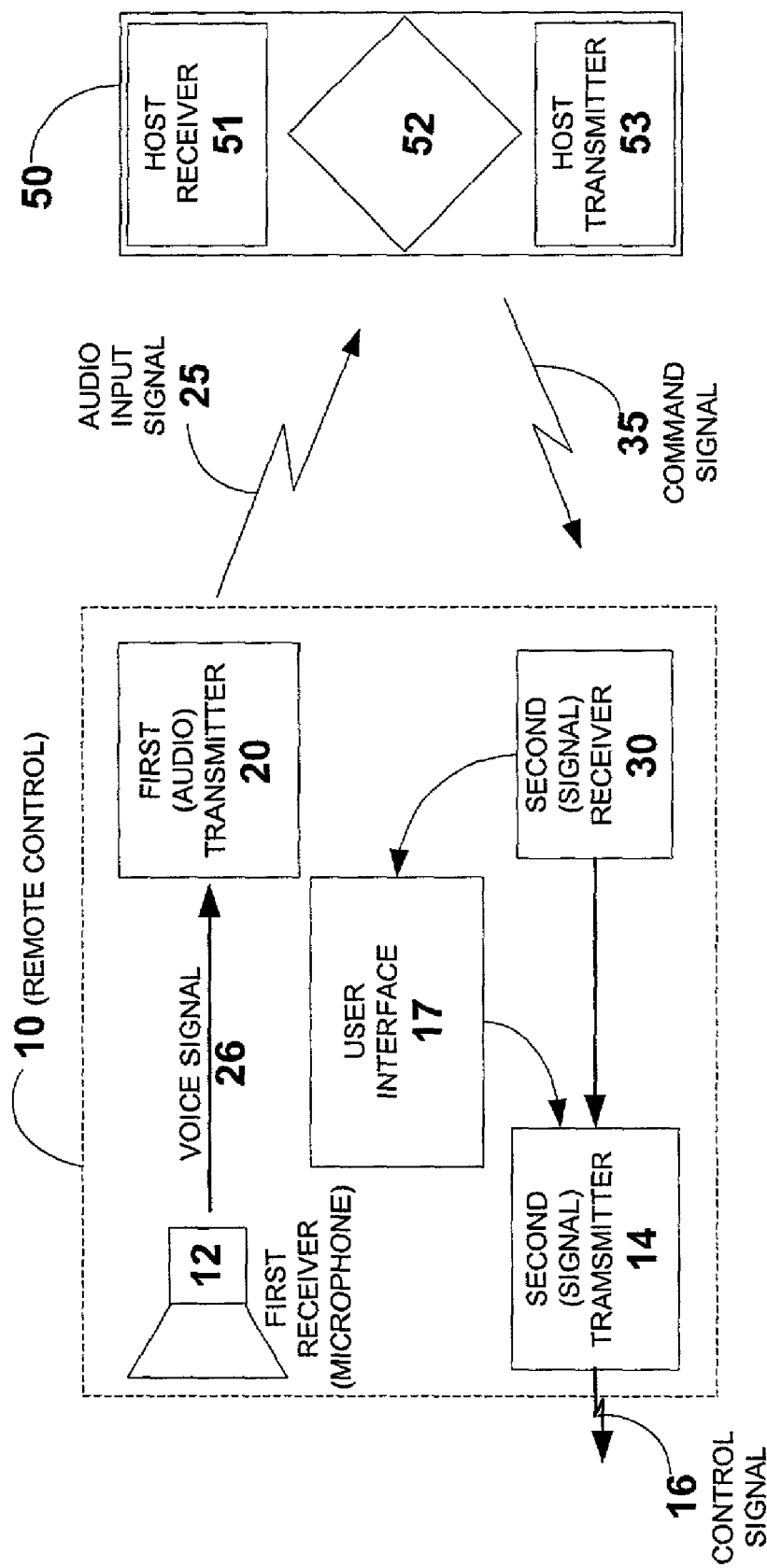
FIG. 2B is a schematic diagram of another embodiment of a voice-translating remote control of the present invention.

FIG. 2B illustrates yet another embodiment of the remote control 10. In this embodiment, the remote control 10 further comprises a user interface 17, which may include a liquid crystal display (LCD) or other components (e.g., light emission diodes, LEDs) to display or indicate the contents of the command signal 35 or to indicate the correctness of the command signal 35. A "user interface" is used herein to refer to a device (or components) that provides feedback (e.g., via LCD or LED) and allows a user to acknowledge and/or make correction, if necessary, before forwarding a command to an appliance. In this embodiment, the user has an opportunity to acknowledge or validate the command signal 35 generated by the host system before sending the control signal 16 to the appliance 60. If there is any error in the command signal 35, the user may have an opportunity to correct the error or to abort the operation and start over. For example, the user interface 17 may display "VCR #1, record channel 13 from 6 PM to 8 PM." Then, the user will acknowledge and send the command to the appliance (VCR #1), if this is correct. Otherwise, the user may correct the error or abort the operation by not sending the control signal 16. Inclusion of such an acknowledgment and validating step in the embodiments of the present invention is preferred because the reliability of speech-recognition technology is not yet foolproof.

Figure 2C:
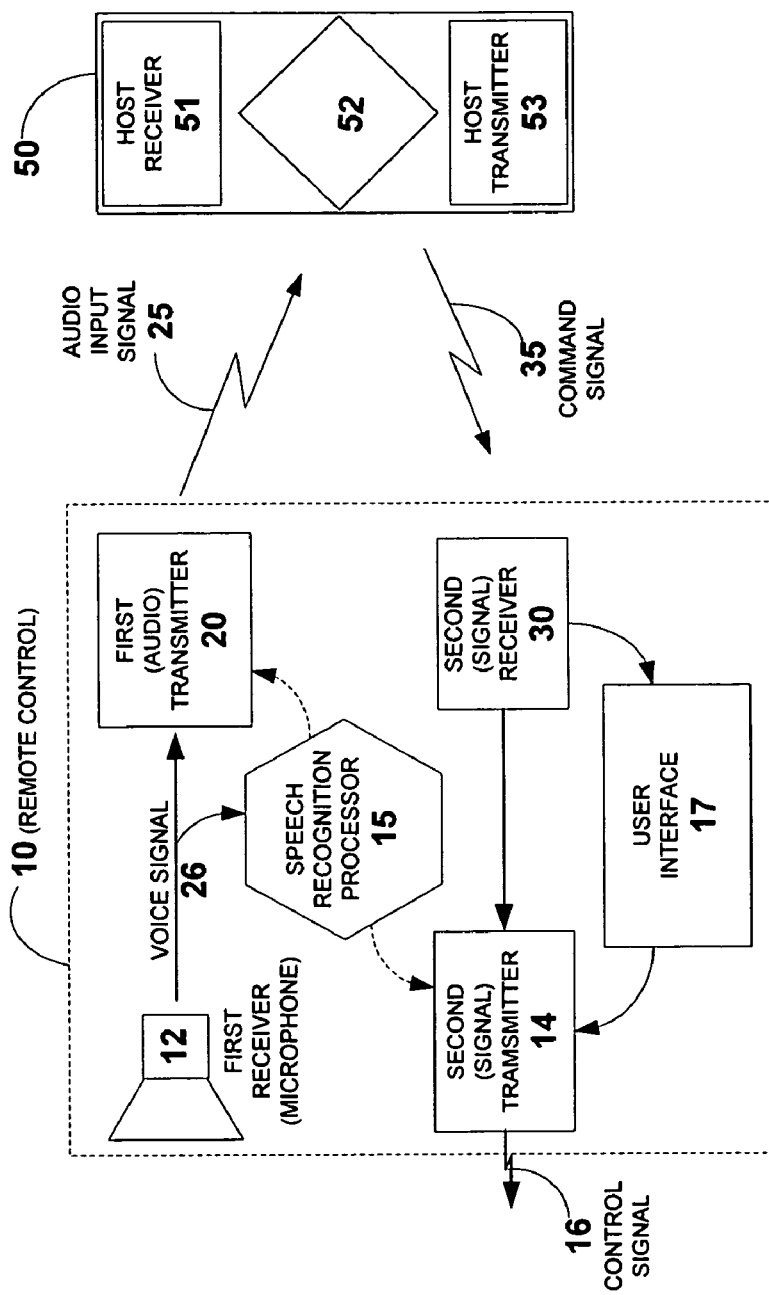
FIG. 2C is a schematic diagram of another embodiment of a voice-translating remote control of the present invention.

A further embodiment, which includes both a trivial speech-recognition processor 15 and a user interface 17, is illustrated in FIG. 2C. In this embodiment, the remote control 10 has both advantages disclosed in the embodiments shown in FIG. 2B and FIG. 2C. That is, the remote control 10 as shown in the embodiment of FIG. 2C is capable of both extracting the appliance identification information from the speech signal 26 and allowing the user to acknowledge or validate the command.

Again, the embodiments as shown in FIGS. 2, 2A, 2B, and 2C are for illustration only. One skilled in the art, with the benefit of this disclosure, will appreciate that other variations are possible without departing from the scope of the present invention.

Figure 3:
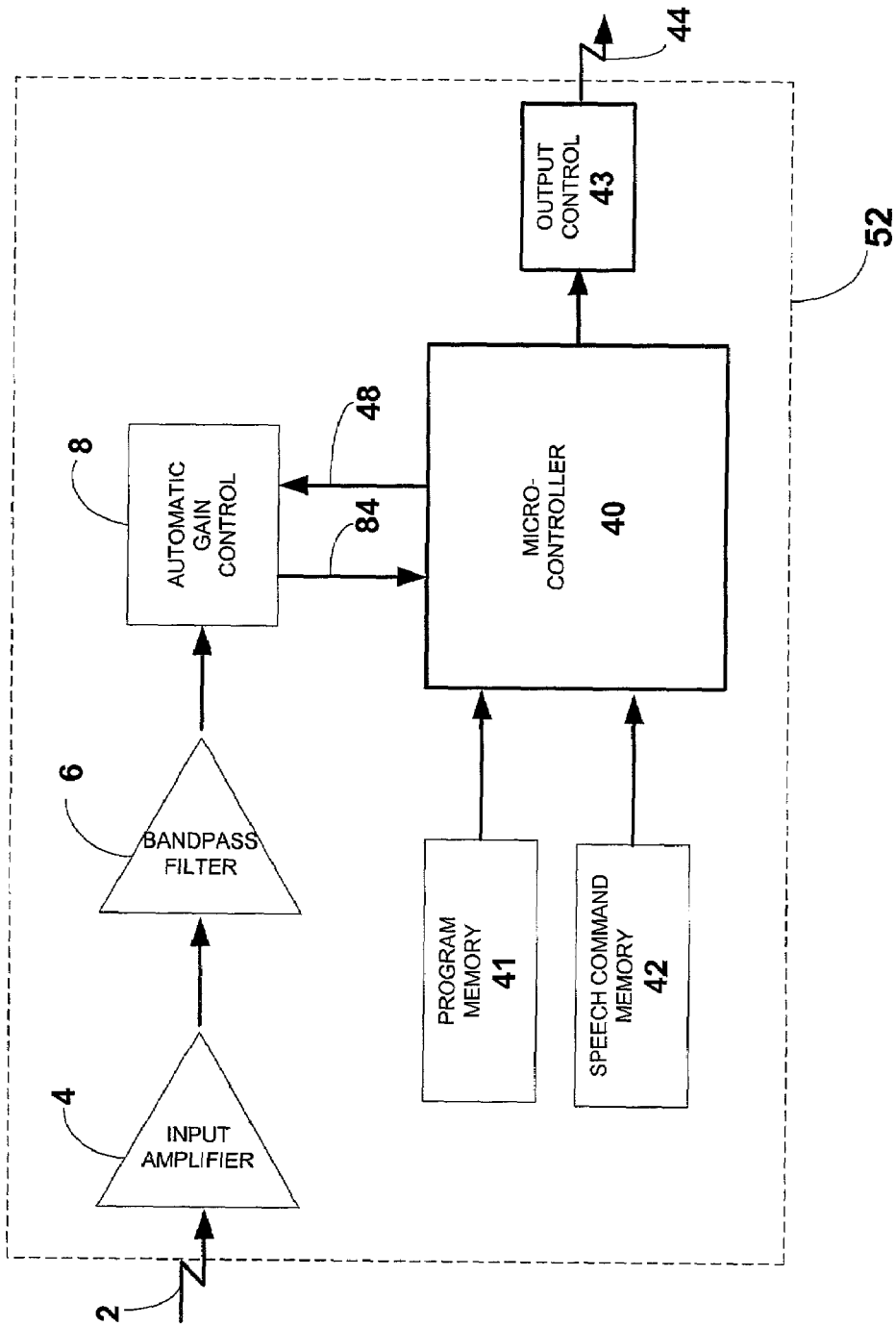
FIG. 3 is a schematic diagram of one embodiment of a speech-recognition processor of the present invention.

The speech-recognition processor 52 of the host system 50 can be any of the speech-recognition systems known in the art or any modification thereof. FIG. 3 illustrates one example of a speech-recognition system. One skilled in the art will appreciate that other variations of the speech-recognition system can be substituted without departing from the scope of the present invention.

Referring to FIG. 3, the input signal 2 received from the host receiver 51 (see FIG. 1) is amplified by an input amplifier 4. Noise is removed from the amplified input signal by a bandpass filter 6, before it is sent to an automatic gain control 8, which is a feedback loop that accepts a varying input signal and uses feedback to maintain a constant output signal. The automatic gain control 8 is in constant communication with a microcontroller 40 by feeding a signal 84 to the microcontroller 40 and receiving a feedback signal 48 back from the microcontroller 40. The microcontroller 40 maintains an ambient signal level during a preset time window by sending the feedback signals 48 to the automatic gain control circuit 8. The ambient level is used as a starting level for recognizing speech. Any background noise received by the device during the time window that is below the ambient level is ignored. After the time window has expired, the device establishes a new ambient level. The microcontroller 40 can be a specialized digital signal processor or a general purpose microcontroller which is configurable for a variety of applications including speech recognition.

The microcontroller circuitry includes the microcontroller 40 and a number of memory modules such as a program memory 41 and speech command memory 42. The program memory 41 may be a Read Only Memory (ROM) module which stores the programming code of the microcontroller 40. The programming code establishes the sequence of events that are followed by the device to produce a control signal 44 in response to valid speech commands. The control signal 44 is delivered by an output control 43 to the host transmitter 53 (see FIG. 1) for transmission to the remote control 10 (see FIG. 1). The speech command memory 42 may employ a Random Access Memory (RAM) module which stores the speech commands. The microcontroller 40 may further include RAM memory (not shown) for performing speech recognition. The term "memory module" does not necessarily refer to separate circuit elements. For example, all ROM data may be stored in the same circuit element, but at different address block locations.

Figure 4:
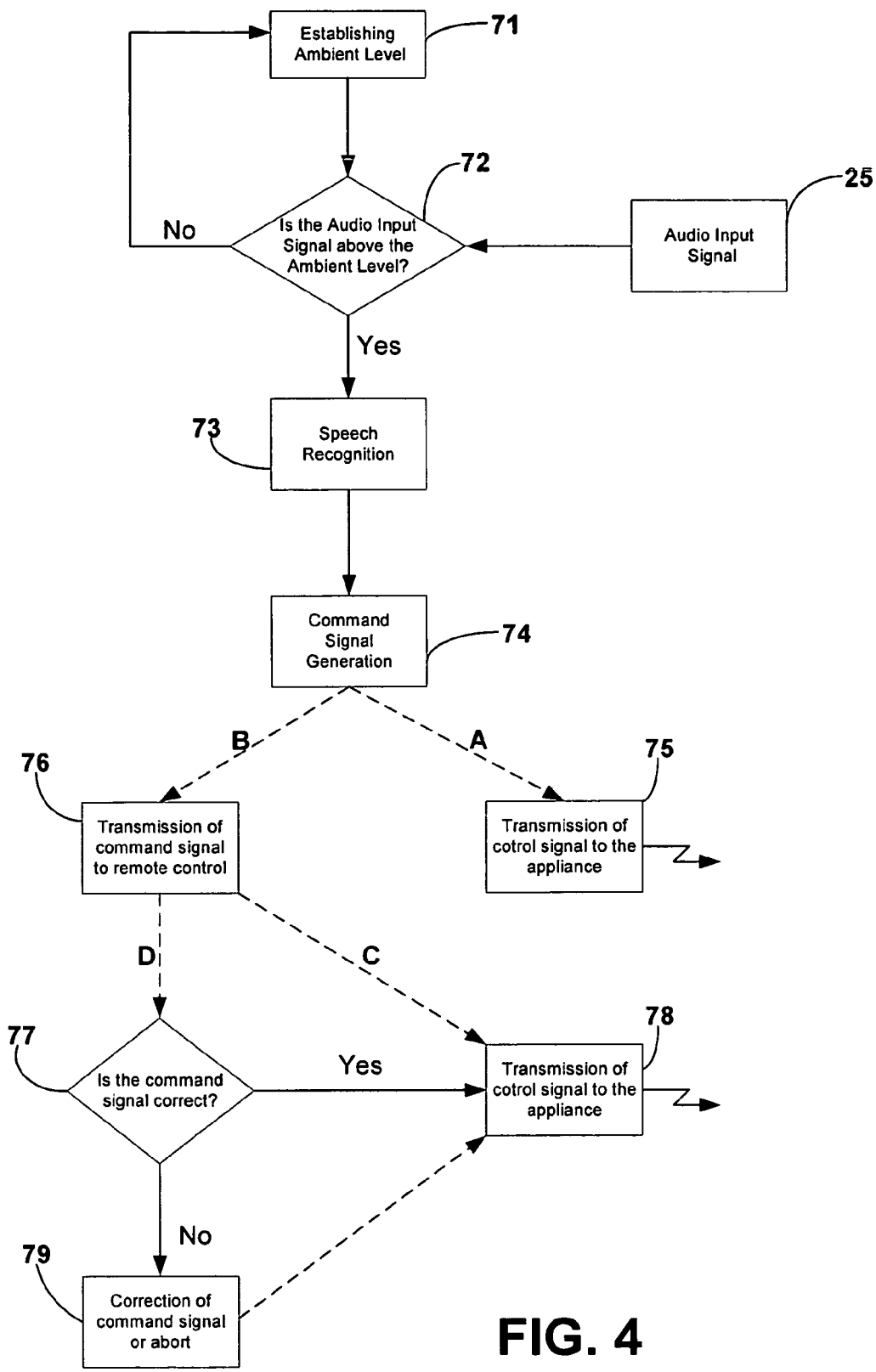
FIG. 4 is a flow chart of the steps involved in some embodiments of a voice-translating remote control system of the present invention.

FIG. 4 is a flow chart illustrating how some embodiments of the present invention may operate. Before the speech-recognition system processes any signal, an ambient level of signal is established in step 71. The ambient level is then compared with the audio input signal 25 (see FIG. 1) received by the host receiver 51 (see FIG. 1) in step 72. If the audio input signal 25 is not above the ambient level, the speech-recognition system will not perform any processing and the system goes back to establish a new ambient level. If the audio input signal 25 is above the ambient level, then the audio input signal is processed in step 73 to generate a command signal 35 (see FIG. 1) in step 74. Depending on the embodiments of the invention, the command signal 35 may be transmitted (pathway A) directly to the appliance 60 (see FIG. 1) or (pathway B) to the remote control 10 (see FIG. 1) in step 76. If the command signal 35 is transmitted to the remote control 10 (pathway B), the command signal 35 may be used (pathway C) to generate a control signal 16 (see FIG. 2) for transmission to the appliance 60 in step 78. Alternatively, the command signal 35 may be sent (pathway D) to a user interface 17 (see FIG. 2C) for user validation in step 77. If the command signal is correct, the user may send it as a control signal 16 to the appliance 60 in step 78. If the command signal 35 has some error, the user may correct the error and then send the corrected command in the form of a control signal 16 to the appliance 60 in step 78. Alternatively, the user may abort the operation, when the command signal includes error.

FIG. 4 illustrates examples of how some embodiments of the present invention may operate. These examples are not comprehensive; other variations are possible. For example, these systems may further include steps for signal amplification and noise filtering. One skilled in the art, having the benefit of this disclosure, will appreciate that other variations are possible without departing from the scope of the present invention.

While the invention has been described using a limited number of embodiments, those skilled in the art, having the benefit of this disclosure, will appreciate that other embodiments are possible without departing from the scope of the invention as disclosed herein. Accordingly, the scope of the invention should be limited only by the attached claims.

What is claimed is:

1. A voice-translating remote control comprising:
    a microphone operable to receive a nontrivial voice command and output a nontrivial voice signal;
    an audio transmitter operably connected to the microphone to transmit an audio input signal to a host system based on the nontrivial voice signal, wherein the host system comprising a nontrivial speech recognition processor;
    a signal receiver arranged to receive a command signal transmitted by the host system;
    a signal transmitter operably connected to the signal receiver to transmit a control signal to an appliance based on the command signal; and
    a user interface for validating the command signal, wherein the user interface configured to display contents of the command signal, wherein the contents of the command signal corresponds to an alpha-numeric representation of the non-trivial voice command.

2. The remote control of claim 1, wherein the signal transmitter is one selected from the group consisting of an infrared transmitter and a radio frequency transmitter.

3. The remote control of claim 1, wherein the audio transmitter transmits the audio input signal to the host system via wireless communication, and the host system transmits the command signal to the signal receiver via wireless communication.

4. The remote control of claim 1, further comprising a memory for storing appliance identity information.

5. The remote control of claim 4, further comprising a nontrivial speech-recognition processor for extracting appliance identification information from the nontrivial voice signal.

6. The remote control of claim 1, wherein the user interface is a liquid crystal display (LCD).

7. The voice-translating remote control of claim 1, wherein the user interface comprises functionality to modify the contents of the command signal.

8. A voice-translating remote control system comprising:
    a host system comprising a host receiver, a nontrivial speech-recognition processor, and a host transmitter, wherein the host receiver is operably connected to the nontrivial speech-recognition processor, which is in turn operably connected to the the host transmitter; and
    a remote control comprising
    a microphone operable to receive a nontrivial voice command and output a nontrivial voice signal,
    an audio transmitter operably connected to the microphone to transmit an audio input signal to the host system based on the nontrivial voice signal,
    a signal receiver arranged to receive a command signal transmitted by the host system, and
    a signal transmitter operably connected to the signal receiver to transmit a control signal to an appliance based on the command signal; and
    a user interface for validating the command signal, wherein the user interface configured to display contents of the command signal, wherein the contents of the command signal corresponds to an alpha-numeric representation of the non-trivial voice command.

9. The voice-translating remote control system of claim 8, wherein the user interface is a liquid crystal display (LCD).

10. The voice-translating remote control system of claim 8, wherein the audio transmitter transmits the audio input signal to the host system via wireless communication, and the host system transmits the command signal to the signal receiver via wireless communication.

11. The voice-translating remote control system of claim 8, wherein the signal transmitter is one selected from the group consisting of an infrared transmitter and a radio frequency transmitter.

12. The voice-translating remote control system of claim 8, wherein the user interface comprises functionality to modify the contents of the command signal.

13. A voice-translating remote control comprising:
a microphone to receive a nontrivial voice command and output a nontrivial voice signal;
a first transmitter means operably connected to the microphone for transmitting an audio input signal to a host system based on the nontrivial voice signal, wherein the host system comprising a nontrivial speech recognition processor;
a receiver means for receiving a command signal transmitted by the host system;
a second transmitter means operably connected to the receiver means for transmitting a control signal to an appliance based on the command signal; and
a user interface for validating the command signal, wherein the user interface is configured to display contents of the command signal wherein the contents of the command signal corresponds to an alpha-numeric representation of the non-trivial voice command.

14. The voice-translating remote control of claim 13, wherein the user interface comprises functionality to modify the contents of the command signal.

15. A method for controlling an appliance using voice commands comprising:
receiving a nontrivial voice command by a microphone in a remote control and outputting a nontrivial voice signal;
transmitting an audio input signal based on the nontrivial voice signal to a host system comprising a host receiver, a speech-recognition processor, and a host transmitter;
processing the audio input signal by the speech-recognition processor to generate a command signal;
transmitting the command signal to the remote control;
receiving the command signal by the remote control;
wirelessly transmitting a control signal to the appliance based on the command signal; and
validating the command signal received by the remote control using a user interface, wherein the user interface is configured to display contents of the command signal and wherein the contents of the command signal corresponds to an alpha-numeric representation of the non-trivial voice command.

16. The method of claim 15, wherein transmitting the audio input signal to the host system is via wireless communication and transmitting the command signal to the remote control is via wireless communication.

17. The method of claim 15, wherein the user interface comprises functionality to modify the contents of the command signal.

* * * * *